United States Patent
Knoll et al.

(10) Patent No.: US 10,378,271 B2
(45) Date of Patent: *Aug. 13, 2019

(54) COATED ARTICLE WITH LOW-E COATING HAVING LOW VISIBLE TRANSMISSION WHICH MAY BE USED IN IG WINDOW UNIT FOR GREY APPEARANCE

(71) Applicant: GUARDIAN EUROPE S.À R.L., Bertrange (LU)

(72) Inventors: Hartmut Knoll, Muldestausee (DE); Marcus Frank, Gelnhausen (DE)

(73) Assignee: GUARDIAN EUROPE S.a.r.l., Bertrange (LU)

( * ) Notice: Subject to any disclaimer, the term of this patent is extended or adjusted under 35 U.S.C. 154(b) by 426 days.

This patent is subject to a terminal disclaimer.

(21) Appl. No.: 14/911,044

(22) PCT Filed: Sep. 12, 2013

(86) PCT No.: PCT/US2013/059406
§ 371 (c)(1),
(2) Date: Feb. 9, 2016

(87) PCT Pub. No.: WO2015/023303
PCT Pub. Date: Feb. 19, 2015

(65) Prior Publication Data
US 2016/0177618 A1 Jun. 23, 2016

(30) Foreign Application Priority Data
Aug. 16, 2013 (WO) ................ PCT/US2013/055357

(51) Int. Cl.
*B32B 7/02* (2019.01)
*E06B 3/66* (2006.01)
(Continued)

(52) U.S. Cl.
CPC .............. *E06B 3/6715* (2013.01); *B32B 7/02* (2013.01); *C03C 17/366* (2013.01);
(Continued)

(58) Field of Classification Search
CPC ............ C03C 17/3626; C03C 17/3644; C03C 17/3681; C03C 17/366; C03C 17/3639;
(Continued)

(56) References Cited

U.S. PATENT DOCUMENTS 5,557,462 A 9/1996 Hartig et al.
7,138,182 B2 * 11/2006 Krisko .................... C03C 17/36
428/433

(Continued)

FOREIGN PATENT DOCUMENTS

EP 0 722 913 7/1996
EP 912455 B1 5/2006
(Continued)

OTHER PUBLICATIONS

International Search Report dated May 19, 2014 for PCT/US2013/059406 (4pgs).
Written Opinion dated May 19, 2014 for PCT/US2013/059406 (7pgs).

*Primary Examiner* — Prashant J Khatri

(57) ABSTRACT

This invention relates to a coated article including a low-emissivity (low-E) coating. In certain example embodiments, the low-E coating is provided on a substrate (e.g., glass substrate) and includes at least first and second infrared (IR) reflecting layers (e.g., silver based layers) that are spaced apart by contact layers (e.g., NiCr based layers) and a dielectric layer of or including a material such as silicon nitride. In certain example embodiments, the coated article has a low visible transmission (e.g., no greater than 60%, more preferably no greater than about 55%, and most preferably no greater than about 50%).

34 Claims, 2 Drawing Sheets

(51) Int. Cl.
  *G02B 5/20*  (2006.01)
  *G02B 5/28*  (2006.01)
  *C03C 17/36*  (2006.01)
  *E06B 3/67*  (2006.01)

(52) U.S. Cl.
  CPC ...... *C03C 17/3626* (2013.01); *C03C 17/3639* (2013.01); *C03C 17/3644* (2013.01); *C03C 17/3649* (2013.01); *C03C 17/3652* (2013.01); *C03C 17/3681* (2013.01); *E06B 3/6612* (2013.01); *G02B 5/208* (2013.01); *G02B 5/282* (2013.01); *G02B 5/285* (2013.01); *Y10T 428/24967* (2015.01)

(58) Field of Classification Search
  CPC ............ C03C 17/3649; C03C 17/3652; G02B 5/20–5/288; G02B 1/10–1/18; E06B 3/6715; E06B 3/6612; Y10T 428/24967
  See application file for complete search history.

(56) References Cited

U.S. PATENT DOCUMENTS

| | | | |
|---|---|---|---|
| 7,521,096 B2 * | 4/2009 | Lemmer | B32B 17/10036 427/557 |
| 8,940,399 B2 | 1/2015 | Wuillaume et al. | |
| 2002/0009601 A1 | 1/2002 | Stachowiak | |
| 2003/0165693 A1 * | 9/2003 | Hartig | C03C 17/36 428/426 |
| 2003/0194570 A1 | 10/2003 | Lingle et al. | |
| 2004/0009356 A1 | 1/2004 | Medwick et al. | |
| 2006/0046018 A1 | 3/2006 | Lemmer et al. | |
| 2007/0036987 A1 * | 2/2007 | Landa | C03C 3/087 428/432 |
| 2009/0047509 A1 | 2/2009 | Gagliardi et al. | |
| 2011/0261442 A1 | 10/2011 | Knoll et al. | |
| 2011/0262726 A1 * | 10/2011 | Knoll | C03C 17/36 428/213 |
| 2012/0094112 A1 | 4/2012 | Imran | |

FOREIGN PATENT DOCUMENTS

| | | |
|---|---|---|
| EP | 2 284 135 | 2/2011 |
| JP | 08-239245 | 9/1996 |
| JP | 08-520539 | 6/2008 |
| JP | 2011-504450 | 2/2011 |
| KR | 10-2011-0062566 | 6/2011 |
| WO | WO 97/48649 | 12/1997 |
| WO | WO 02/48065 | 6/2002 |
| WO | WO 2005/091864 | 10/2005 |
| WO | WO 2006/057846 | 6/2006 |
| WO | WO 2006/063171 | 6/2006 |
| WO | WO 2009/067263 | 5/2009 |
| WO | WO 2011/133201 | 10/2011 |
| WO | WO 2012/050596 | 4/2012 |

* cited by examiner

COATED ARTICLE WITH LOW-E COATING HAVING LOW VISIBLE TRANSMISSION WHICH MAY BE USED IN IG WINDOW UNIT FOR GREY APPEARANCE

This application is the U.S. national phase of International Application No. PCT/US2013/059406 filed 12 Sept. 2013 which designated the U.S., and claims priority on International Application No. PCT/US2013/055357 filed 16 Aug. 2013 which designated the U.S., the entire contents of which are all hereby incorporated herein by reference.

This invention relates to a coated article including a low-emissivity (low-E) coating for allowing a coated glass article to have desirable grey glass side reflective coloration without necessarily having to have a grey glass substrate. In certain example embodiments, the low-E coating is provided on a substrate (e.g., glass substrate) and includes at least first and second infrared (IR) reflecting layers (e.g., silver based layers) that are spaced apart by contact layers (e.g., NiCr based layers) and a dielectric layer of or including a material such as silicon nitride. In certain example embodiments, the coated article (monolithic form and/or in IG window unit form) has a low visible transmission (e.g., no greater than 55%, more preferably no greater than about 50%, more preferably no greater than about 45%, and most preferably no greater than about 40%). In certain example embodiments, the coated article may be heat treated (e.g., thermally tempered and/or heat bent), and is designed to be substantially thermally stable upon heat treatment (HT) in that its $\Delta E^*$ value (glass side reflective) due to HT is no greater than 5.0, and more preferably no greater than 4.5, and most preferably no greater than 4.1. Coated articles according to certain example embodiments of this invention may be used in the context of insulating glass (IG) window units, vehicle windows, or other types of windows.

BACKGROUND OF THE INVENTION

Coated articles are known in the art for use in window applications such as insulating glass (IG) window units, vehicle windows, and/or the like. It is known that in certain instances, it is desirable to heat treat (e.g., thermally temper, heat bend and/or heat strengthen) such coated articles for purposes of tempering, bending, or the like. Heat treatment (HT) of coated articles typically requires use of temperature(s) of at least 580 degrees C., more preferably of at least about 600 degrees C. and still more preferably of at least 620 degrees C. Such high temperatures (e.g., for 5-10 minutes or more) often cause coatings to break down and/or deteriorate or change in an unpredictable manner. Thus, it is desirable for coatings to be able to withstand such heat treatments (e.g., thermal tempering), if desired, in a predictable manner that does not significantly damage the coating.

In certain situations, designers of coated articles strive for a combination of desirable visible transmission, desirable color, low emissivity (or emittance), and low sheet resistance ($R_s$). Low-emissivity (low-E) and low sheet resistance characteristics permit such coated articles to block significant amounts of IR radiation so as to reduce for example undesirable heating of vehicle or building interiors.

U.S. Pat. No. 7,521,096, incorporated herein by reference, discloses a low-E coating which uses zinc oxide (ZnO) contact layers below the silver-based IR reflecting layers, and above the bottom silver (Ag) based IR reflecting layer uses a $NiCrO_x$ contact layer followed by a center tin oxide ($SnO_2$) dielectric layer. While the ZnO contact layers below the silver IR reflecting layers provide good structural properties for the growth of silver, the ZnO has been found to degrade the chemical, environmental and mechanical durability of the coating in certain instances.

U.S. Pat. No. 5,557,462 discloses a low-E coating with a layer stack of SiN/NiCr/Ag/NiCr/SiN/NiCr/Ag/NiCr/SiN. However, the coated article of the '462 patent is designed for a high visible transmission of at least 63%. The '462 patent at column 3, lines 12-15, teaches that visible transmission below 70% (monolithic coated article) and below 63% (IG window unit) are undesirable. Thus, the '462 patent teaches directly away from coated articles with visible transmission lower than 63%. Moreover, as largely explained in U.S. Pat. No. 8,173,263, coated articles of the '462 patent are not heat treatable because upon heat treatment sheet resistance ($R_s$) goes way up such as from about 3-5 to well over 10, haze tends to set in, and the glass side reflective $\Delta E^*$ value is undesirable because it is over 5.0.

Accordingly, it would be desirable to provided a coated article that is characterized by one, two, three or all four of: (i) low visible transmission, (ii) good durability, (iii) desirable coloration, and/or (iv) thermal stability upon HT so as to realize a glass side reflective $\Delta E^*$ value no greater than about 5.0, more preferably no greater than about 4.5. Moreover, it may also be desirable for IG window units which include such coated articles to have low solar factor (SF), and/or low outside reflectance such as no greater than about 12%, more preferably no greater than about 11%, still more preferably no greater than about 10%, and most preferably no greater than about 9%. See EN 410 regarding calculation of SF and visible transmission of an IG unit.

The term $\Delta E^*$ (and $\Delta E$) is well understood in the art and is reported, along with various techniques for determining it, in ASTM 2244-93 as well as being reported in Hunter et. al., *The Measurement of Appearance*, $2^{nd}$ Ed. Cptr. 9, page 162 et seq. [John Wiley & Sons, 1987]. As used in the art, $\Delta E^*$ (and $\Delta E$) is a way of adequately expressing the change (or lack thereof) in reflectance and/or transmittance (and thus color appearance, as well) in an article after or due to heat treatment. $\Delta E$ may be calculated by the "ab" technique, or by the Hunter technique (designated by employing a subscript "H"). $\Delta E$ corresponds to the Hunter Lab L, a, b scale (or $L_h$, $a_h$, $b_h$). Similarly, $\Delta E^*$ corresponds to the CIE LAB Scale $L^*$, $a^*$, $b^*$. Both are deemed useful, and equivalent for the purposes of this invention. For example, as reported in Hunter et. al. referenced above, the rectangular coordinate/scale technique (CIE LAB 1976) known as the $L^*$, $a^*$, $b^*$ scale may be used, wherein: $L^*$ is (CIE 1976) lightness units; $a^*$ is (CIE 1976) red-green units; $b^*$ is (CIE 1976) yellow-blue units; and the distance $\Delta E^*$ between $L^*_o$ $a^*_o$ $b^*_o$ and $L^*_1$ $a^*_1$ $b^*_1$ is: $\Delta E^* = [(\Delta L^*)^2 + (\Delta a^*)^2 + (\Delta b^*)^2]^{1/2}$, where: $\Delta L^* = L^*_1 - L^*_o$; $\Delta a^* = a^*_1 - a^*_o$; $\Delta b^* = b^*_1 - b^*_o$; where the subscript "o" represents the coating (coated article) before heat treatment and the subscript "1" represents the coating (coated article) after heat treatment; and the numbers employed (e.g., $a^*$, $b^*$, $L^*$) are those calculated by the aforesaid (CIE LAB 1976) $L^*$, $a^*$, $b^*$ coordinate technique. When, for example, glass side reflective $\Delta E^*$ values are measured, then glass side reflective $a^*$, $b^*$ and $L^*$ values are used. In a similar manner, $\Delta E$ may be calculated using the above equation for $\Delta E^*$, i.e., $\Delta E^* = [(\Delta L^*)^2 + (\Delta a^*)^2 + (\Delta b^*)^2]^{1/2}$, by replacing $a^*$, $b^*$, $L^*$ with Hunter Lab values $a_h$, $b_h$, $L_h$. Also within the scope of this invention and the quantification of $\Delta E^*$ are the equivalent numbers if converted to those calculated by any other technique employing the same concept of $\Delta E^*$ as defined above.

U-value (sometimes referred to as U-factor) is a measure of heat loss in a building element such as a wall, floor, window or roof. It can also be referred to as an overall heat transfer co-efficient and measures how well parts of a building transfer heat. This means that the higher the U-value the worse the thermal performance of the building envelope. A low U-value usually indicates high levels of insulation. In other words, U-value measures how well a product prevents heat from escaping a home or building. The lower the U-value, the better a product is at keeping heat inside the building. U-value herein is measured in units of W/m$^2$K) unless otherwise stated. See EN 673 regarding calculation of U-value.

BRIEF SUMMARY OF EXAMPLE EMBODIMENTS OF THE INVENTION

This invention relates to a coated article including a low-emissivity (low-E) coating for allowing a coated glass article to have desirable grey glass side reflective coloration without necessarily having to have a grey glass substrate. In certain example embodiments, the low-E coating is provided on a substrate (e.g., glass substrate) and includes at least first and second infrared (IR) reflecting layers (e.g., silver based layers) that are spaced apart by contact layers (e.g., NiCr based layers) and a dielectric layer of or including a material such as silicon nitride. In certain example embodiments, the coated article has a low visible transmission (e.g., no greater than 55%, more preferably no greater than about 50%, more preferably no greater than about 45%, and most preferably no greater than about 40%, measured monolithically and/or in an IG unit). In certain example embodiments, the coated article may be heat treated (e.g., thermally tempered and/or heat bent), and is designed to be substantially thermally stable upon heat treatment (HT) in that its ΔE* value (glass side reflective) measured monolithically due to HT is no greater than 5.0, more preferably no greater than 4.5, and still more preferably of no greater than 4.1. Such a low ΔE* value indicates that the coated article has approximately the same transmission and color characteristics as viewed by the naked eye both before and after heat treatment (e.g., thermal tempering). Coated articles according to certain example embodiments of this invention may be used in the context of insulating glass (IG) window units, vehicle windows, or other types of windows.

It is desired to provide a coated article that is characterized by one, two, three, or all four of: (i) low visible transmission, (ii) good durability, (iii) desirable grey glass side coloration, and (iv) thermal stability upon HT so as to realize a glass side reflective ΔE* value no greater than 5.0, more preferably no greater than 4.5. Moreover, it is desirable for IG window units which include such coated articles to have one, two, or all three of: (a) low solar factor (SF) such as no greater than about 33%, more preferably no greater than about 31%, still more preferably no greater than about 29%, and even more preferably no greater than about 27%, (b) low outside reflectance such as no greater than about 12%, more preferably no greater than about 11%, still more preferably no greater than about 10%, and most preferably no greater than about 9%, and/or (c) outside reflective grey coloration.

In certain example embodiments of this invention, there is provided a an insulating glass (IG) window unit comprising: a coated article including a coating supported by a first glass substrate; the first glass substrate with the coating thereon being coupled to a second glass substrate with a gap therebetween, and wherein the first glass substrate is adapted to be at an exterior/outside side of the IG window unit and the second glass substrate is adapted to be at an interior/inside side of the IG window unit adjacent an interior of a building on which the IG window unit is mounted or is to be mounted, and wherein the coating is on a major surface of the first glass substrate facing the gap between the substrates; wherein the coating supported by the first glass substrate comprises: first and second infrared (IR) reflecting layers comprising silver, the first IR reflecting layer being located closer to the glass substrate than is the second IR reflecting layer; a first contact layer comprising NiCr located over and directly contacting the first IR reflecting layer comprising silver; a dielectric layer comprising silicon nitride located over and directly contacting the first contact layer comprising NiCr; a second contact layer located over and directly contacting the layer comprising silicon nitride; the second IR reflecting layer comprising silver located over and directly contacting the second contact layer; a third contact layer comprising NiCr located over and directly contacting the second IR reflecting layer; another dielectric layer comprising silicon nitride located over and directly contacting the third contact layer comprising NiCr; wherein the second IR reflecting layer comprising silver is at least 30 angstroms thicker than is the first IR reflecting layer comprising silver; wherein the IG window unit has a visible transmission of no greater than 50% and an outside visible reflectance of no greater than 12%; and wherein the IG window unit is grey or dark grey in appearance as viewed from the outside, and wherein the first and second glass substrates of the IG window unit are clear, not grey, glass substrates.

In certain example embodiments of this invention, there is provided coated article including a coating supported by a glass substrate, the coating comprising: first and second infrared (IR) reflecting layers comprising silver, the first IR reflecting layer being located closer to the glass substrate than is the second IR reflecting layer; a first contact layer comprising NiCr located over and directly contacting the first IR reflecting layer comprising silver; a dielectric layer comprising silicon nitride located over and directly contacting the first contact layer comprising NiCr; a second contact layer comprising NiCr located over and directly contacting the layer comprising silicon nitride; the second IR reflecting layer comprising silver located over and directly contacting the second contact layer comprising NiCr; a third contact layer comprising NiCr located over and directly contacting the second IR reflecting layer; another dielectric layer comprising silicon nitride located over and directly contacting the third contact layer comprising NiCr; wherein the second IR reflecting layer comprising silver is at least twice as thick as the first IR reflecting layer comprising silver; and wherein the coated article has a visible transmission, measured monolithically, of no greater than 55% and a glass side visible reflectance, measured monolithically, of no greater than 11%.

DETAILED DESCRIPTION OF EXAMPLE EMBODIMENTS OF THE INVENTION

Coated articles herein may be used in applications such as IG window units, laminated window units (e.g., for use in vehicle or building applications), vehicle windows, monolithic architectural windows, residential windows, and/or any other suitable window application that includes single or multiple glass substrates.

In certain example embodiments, the outside (glass side) color of an IG window unit including a coated article will be grey or dark grey, and the coating is capable of allowing IG window units to realize low visible transmission, low solar factor, low outside visible reflection, low emissivity, and low U-value. In certain example embodiments, it is possible to achieve a very low outside reflection in IG window units with outside reflective grey coloration when a clear base glass is used in a coated article which can make up the outside lite of the IG window unit. Thus, it is not necessary to use a grey base glass for the mentioned outside impression. Clear glass is less expensive and has a much better availability than grey base glass. While grey glass substrates could possibly be used in example embodiments of this invention, preferred embodiments use clear or neutral colored glass substrates and achieve the desired grey coloration due to the coating design without the need for grey colored glass. While the coated articles herein may be heat treated (e.g., thermally tempered), coated articles according to example embodiments of this invention need not be heat treated and may be either HT or non-HT.

Figure 1:
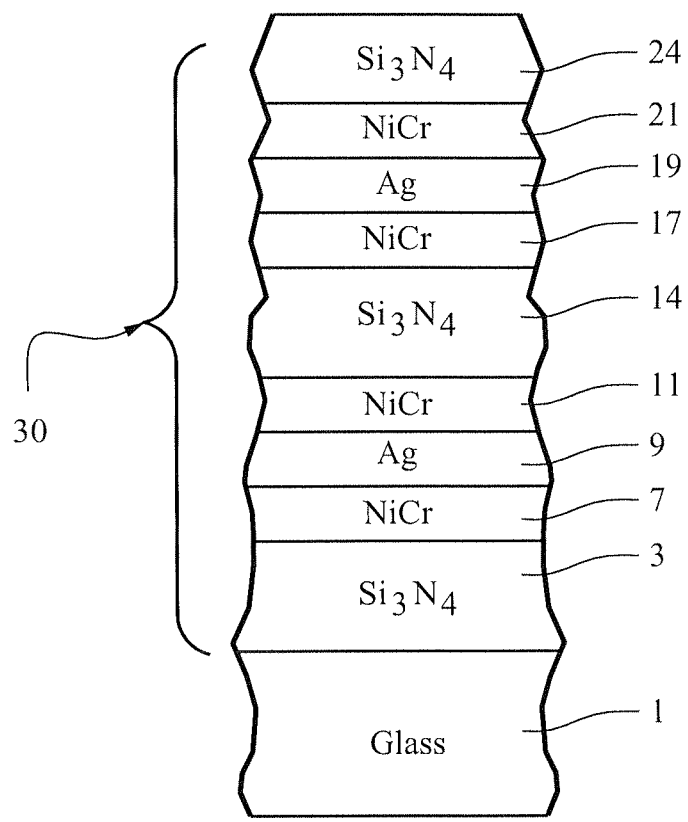
FIG. 1 is a cross sectional view of a coated article according to an example embodiment of this invention.

In certain example embodiments of this invention, the coating includes a double-silver stack. Referring to FIG. 1 for example, in certain example embodiments of this invention, there is provided a coated article including a coating 30 supported by a glass substrate 1, the coating 30 comprising: first 9 and second 19 infrared (IR) reflecting layers comprising or consisting essentially of silver, the first IR reflecting layer 9 being located closer to the glass substrate 1 than is the second IR reflecting layer 19; a first contact layer comprising NiCr 7 located under and directly contacting the first IR reflecting layer comprising silver 9, a second contact layer 11 located over and directly contacting the first IR reflecting layer comprising silver 9; a transparent dielectric layer of or including silicon nitride 14 located over and directly contacting the second contact layer comprising NiCr 11; a third contact layer comprising NiCr 17 located over and directly contacting the layer comprising silicon nitride 14; the second IR reflecting layer comprising silver 19 located over and directly contacting the third contact layer comprising NiCr 17; a fourth contact layer comprising NiCr 21 located over and directly contacting the second IR reflecting layer 19, and wherein the second IR reflecting layer comprising silver 19 is at least as thick as the first IR reflecting layer comprising silver 9. In certain preferred embodiments, it has been found that surprisingly beneficial results can be achieved when the second IR reflecting layer of or including silver 19 is thicker than the first IR reflecting layer of or including silver 9, more preferably when second IR reflecting layer 19 is at least 10 angstroms (Å) thicker (more preferably at least 20 angstroms thicker, even more preferably at least 30 angstroms thicker, still more preferably at least 40 angstroms thicker, still more preferably at least 50 angstroms thicker, and most preferably at least 65 angstroms thicker) than the first IR reflecting layer comprising silver 9. The coating in FIG. 1 includes three transparent dielectric layers 3, 14 and 24 of or including silicon nitride, as shown in FIG. 1. Moreover, the coating may optionally include an overcoat layer (not shown) of or including zirconium oxide and/or zirconium oxynitride, where such an optional overcoat layer can be located over and directly contacting silicon nitride based layer 24. In certain example embodiments, this overcoat layer of or including zirconium oxide and/or zirconium oxynitride 27 may be thinner than one or both of the IR reflecting layers 9, 19. In certain example embodiments of this invention, each of the IR reflecting layers comprising silver 9 and 19 may be at least twice as thick, and more preferably at least three times as thick, as the optional overcoat layer of or including zirconium oxide and/or zirconium oxynitride. In certain example embodiments of this invention, the coating 30 includes only two IR reflecting layers 9, 19 of or including silver or the like.

Figure 2:
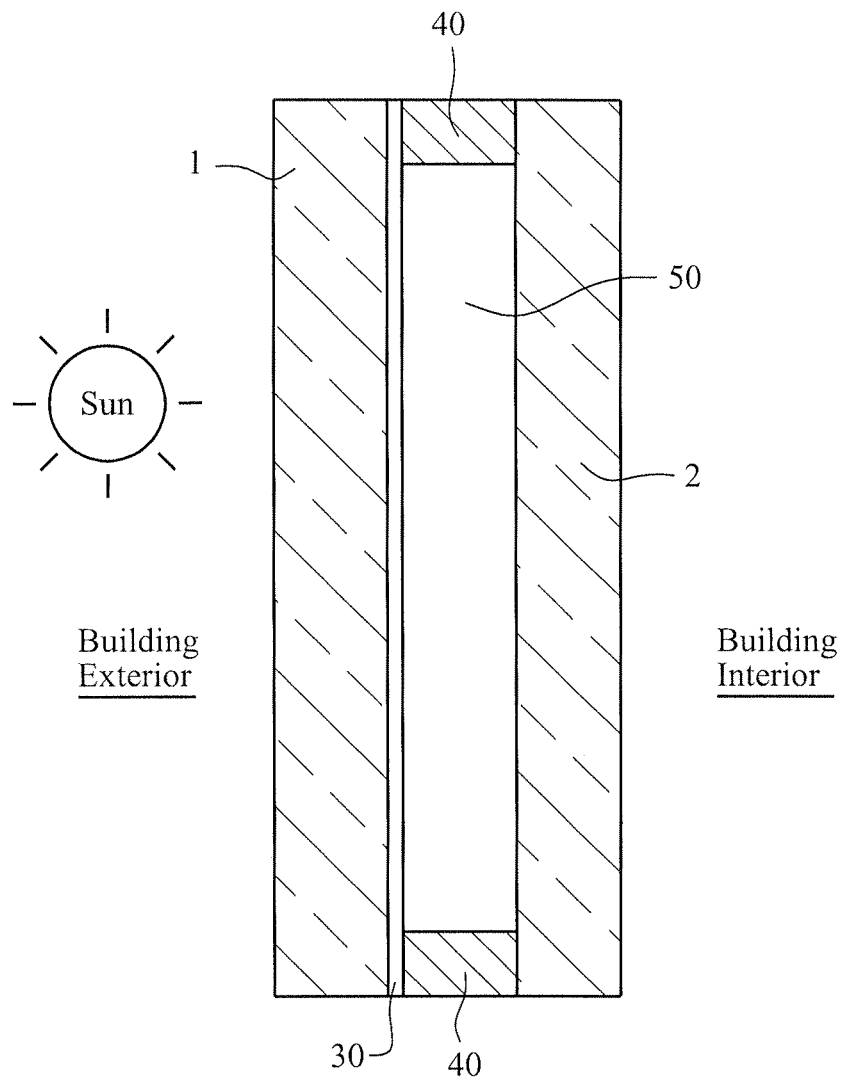
FIG. 2 is a cross sectional view showing the coated article of FIG. 1 provided in an IG window unit according to an example embodiment of this invention.

In order to increase durability, along with optics and thermal properties, and avoid significant structural changes before and after HT, coated articles according to certain example embodiments of this invention have a center dielectric layer 14 of or including silicon nitride and lower contact layers 7, 17 are based on NiCr (as opposed to ZnO). It has also been found that using metallic or substantially metallic NiCr (possibly partly nitrided) for layer(s) 7, 11, 17 and/or 21 improves chemical, mechanical and environmental durability (compared to using ZnO lower contact layers below silver and/or highly oxided NiCr upper contact layers above silver). It has also been found that sputter-depositing silicon nitride inclusive layer 14 in an amorphous state, so that it is amorphous in both as-coated and HT states, helps with overall stability of the coating. For example, 5% HCl at 65 degrees C. for one hour will remove the coating of U.S. Pat. No. 7,521,096, whereas the coating shown in FIG. 1 and the examples herein will survive this HCl test. And in high temperature and high humidity environment, there is less damage to the coating of FIG. 1 and the examples herein after ten days of exposure, than to the coating of the '096 patent after two days of exposure. And regarding high corrosive chemicals such as those used for "brick wash", corrosion resistance is such that edge deletion need not be performed in certain example IG and laminated embodiments. Moreover, it has been found that making the top Ag based IR reflecting layer 19 thicker than the bottom Ag based IR reflecting layer 9 improves certain optical characteristics of the coating. The coating can be used as-coated, or heat treated, due to the relatively low ΔE* values discussed herein. For example, when the coating 30 is located surface #2 of an IG window unit (as shown in FIG. 2), low glass side reflective ΔE* values due to heat treatment indicate that the coated article has approximately the same transmission and color characteristics as viewed by the naked eye both before and after heat treatment (e.g., thermal tempering), and thus can be used either as-coated or as heat treated without significantly affecting optical characteristics thereof.

In certain example embodiments of this invention such as FIG. 1, heat treated or non-heat-treated coated articles having multiple IR reflecting layers (e.g., two spaced apart silver based layers 9 and 19) are capable of realizing a sheet resistance ($R_s$) of less than or equal to 5.0 (more preferably less than or equal to 4.0 ohms/square). The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of at least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

FIG. 1 is a side cross sectional view of a coated article according to an example non-limiting embodiment of this invention. The coated article includes substrate 1 (e.g., clear, green, bronze, grey, or blue-green glass substrate from about 1.0 to 12.0 mm thick, more preferably from about 4 mm to 8 mm thick), and low-E coating (or layer system) 30 provided on the substrate 1 either directly or indirectly. The coating (or layer system) 30 includes, for example: bottom dielectric silicon nitride layer 3 which may be $Si_3N_4$, or of the Si-rich type silicon nitride for haze reduction, or of any other suitable stoichiometry silicon nitride in different embodiments of this invention, lower contact layer 7 (which contacts bottom IR reflecting layer 9), first conductive and preferably metallic or substantially metallic infrared (IR) reflecting layer 9, upper contact layer 11 (which contacts layer 9), dielectric silicon nitride based and/or inclusive layer 14, lower contact layer 17 (which contacts IR reflecting layer 19), second conductive and preferably metallic or substantially metallic IR reflecting layer 19, upper contact layer 21 (which contacts layer 19), and transparent dielectric silicon nitride layer 24 which may be $Si_3N_4$, of the Si-rich type for haze reduction, or of any other suitable stoichiometry silicon nitride in different embodiments of this invention. The "contact" layers 7, 11, 17 and 21 each contact an IR reflecting layer (e.g., layer based on Ag). The aforesaid layers 3-24 make up low-E (i.e., low emissivity) coating 30 that is provided on glass substrate 1. Layers 3-24 may be sputter-deposited on the substrate 1 in certain example embodiments of this invention, with each layer being sputter-deposited in vacuum using one or more targets as needed (the sputtering targets may be ceramic or metallic). Metallic or substantially metallic layers (e.g., layers 7, 9, 11, 17, 19 and 21) may be sputtered in an atmosphere containing argon gas, whereas nitrided layers (e.g., layers 3, 7, 11, 14, 17, 21 and 24) may be sputtered in an atmosphere containing a mixture of nitrogen and argon gas. The contact layers 7, 11, 17 and 21 may or may not be nitrided in different example embodiments of this invention.

In monolithic instances, the coated article includes only one glass substrate 1 as illustrated in FIG. 1. However, monolithic coated articles herein may be used in devices such as laminated vehicle windshields, IG window units, and the like. As for IG window units, an IG window unit may include two spaced apart glass substrates. An example IG window unit is illustrated and described, for example, in U.S. Patent Document No. 2004/0005467, the disclosure of which is hereby incorporated herein by reference. FIG. 2 shows an example IG window unit including the coated glass substrate 1 shown in FIG. 1 coupled to another glass substrate 2 via spacer(s), sealant(s) 40 or the like, with a gap 50 being defined therebetween. This gap 50 between the substrates in IG window unit embodiments may in certain instances be filled with a gas such as argon (Ar). An example IG unit may comprise a pair of spaced apart clear glass substrates 1 and 2 each about 3-4 mm thick, one of which is coated with a coating 30 herein in certain example instances, where the gap 50 between the substrates may be from about 5 to 30 mm, more preferably from about 10 to 20 mm, and most preferably about 16 mm. In certain example instances, the low-E coating 30 may be provided on the interior surface of either substrate facing the gap (the coating is shown on the interior major surface of substrate 1 in FIG. 2 facing the gap 50, but instead could be on the interior major surface of substrate 2 facing the gap 50). Either substrate 1 or substrate 2 may be the outermost substrate of the IG window unit at the building exterior (e.g., in FIG. 2 the substrate 1 is the substrate closest to the building exterior, and the coating 30 is provided on surface #2 of the IG window unit). In preferred embodiments of this invention, the coating 30 is provided on surface #2 of the IG window unit as shown in FIG. 2.

In certain example embodiments of this invention, one, two, three, or all four of contact layers 7, 11, 17, 21 may be of or include NiCr (any suitable ratio of Ni:Cr), and may or may not be nitrided ($NiCrN_x$). In certain example embodiments, one, two, three or all four of these NiCr inclusive layers 7, 11, 17, 21 is/are substantially or entirely non-oxidized. In certain example embodiments, layers 7, 11, 17 and 21 may all be of metallic NiCr or substantially metallic NiCr (although trace amounts of other elements may be present). In certain example embodiments, one, two, three or all four of NiCr based layers 7, 11, 17, 21 may comprise from 0-10% oxygen, more preferably from 0-5% oxygen, and most preferably from 0-2% oxygen (atomic %). In certain example embodiments, one, two, three or all four of these layers 7, 11, 17, 21 may contain from 0-20% nitrogen, more preferably from 1-15% nitrogen, and most preferably from about 1-12% nitrogen (atomic %). NiCr based layers 7, 11, 17 and/or 21 may or may not be doped with other material(s) such as stainless steel, Mo, or the like. It has been found that the use of NiCr based contact layer(s) 7 and/or 17 under the silver-based IR reflecting layer(s) 9, 19 improves durability of the coated article (compared to if layers 7 and 17 were instead of ZnO). Moreover, it was surprisingly found that making layers 7, 11, 17 and 21 of or consisting essentially of NiCr provided for improved durability, as introduction of more than trace amounts of oxygen resulted in undesirable haze and reduced durability compared to if the layers 7, 11, 17 and 21 consist essentially of NiCr.

Dielectric layers 3, 14, and 24 may be of or include silicon nitride in certain embodiments of this invention. Silicon nitride layers 3, 14 and 24 may, among other things, improve heat-treatability of the coated articles and protect the other layers during optional HT, e.g., such as thermal tempering or the like. One or more of the silicon nitride of layers 3, 14, 24 may be of the stoichiometric type (i.e., $Si_3N_4$), or alternatively of the Si-rich type of silicon nitride in different embodiments of this invention. The presence of free Si in a Si-rich silicon nitride inclusive layer 3 and/or 14 may, for example, allow certain atoms such as sodium (Na) which migrate outwardly from the glass 1 during HT to be more efficiently stopped by the Si-rich silicon nitride inclusive layer(s) before they can reach silver and damage the same. Thus, it is believed that the Si-rich $Si_xN_y$ can reduce the amount of damage done to the silver layer(s) during HT in certain example embodiments of this invention thereby allowing sheet resistance ($R_s$) to decrease or remain about the same in a satisfactory manner. Moreover, it is believed that the Si-rich $Si_xN_y$ in layers 3, 14 and/or 24 can reduce the amount of damage (e.g., oxidation) done to the silver and/or NiCr during HT in certain example optional embodiments of this invention. In certain example embodiments, when Si-rich silicon nitride is used, the Si-rich silicon nitride layer (3, 14 and/or 24) as deposited may be characterized by $Si_xN_y$ layer(s), where x/y may be from 0.76 to 1.5, more preferably from 0.8 to 1.4, still more preferably from 0.82 to 1.2. Any and/or all of the silicon nitride layers discussed herein may be doped with other materials such as stainless steel or aluminum in certain example embodiments of this invention. For example, any and/or all silicon nitride layers 3, 14, 24 discussed herein may optionally include from about 0-15% aluminum, more preferably from about 1 to 10% aluminum, in certain example embodiments of this invention. The silicon nitride of layers 3, 14, 24 may be deposited by sputtering a target of Si or SiAl, in an atmosphere having argon and nitrogen gas, in certain embodiments of this invention. Small amounts of oxygen may also be provided in certain instances in the silicon nitride layers.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. As another example, a zirconium oxide overcoat layer may be provided in coating 30.

While various thicknesses and materials may be used in layers in different embodiments of this invention, example thicknesses and materials for the respective layers on the glass substrate 1 in the FIG. 1 embodiment are as follows, from the glass substrate outwardly (physical thicknesses recited):

Example Materials/Thicknesses; FIG. 1 Embodiment

| Layer | Preferred Range (Å) | More Preferred (Å) | Example (Å) |
|---|---|---|---|
| Glass (1-10 mm thick) | | | |
| $Si_xN_y$ (layer 3) | 100-500 Å | 250-450 Å | 380 Å |
| NiCr or NiCrN (layer 7) | 10-30 Å | 11-20 Å | 15 Å |
| Ag (layer 9) | 30-150 Å | 30-70 Å | 50 Å |
| NiCr or NiCrN (layer 11) | 10-30 Å | 11-20 Å | 15 Å |
| $Si_xN_y$ (layer 14) | 300-1400 Å | 650-1100 Å | 740 Å |
| NiCr or NiCrN (layer 17) | 7-30 Å | 9-20 Å | 10 Å |
| Ag (layer 19) | 80-225 Å | 110-180 Å | 130 Å |
| NiCr or NiCrN (layer 21) | 8-30 Å | 9-20 Å | 10 Å |
| $Si_3N_4$ (layer 24) | 120-360 Å | 250-340 Å | 290 Å |
| $ZrO_2$ (not shown; optional) | 25-80 Å | 25-50 Å | 35 Å |

The second IR reflecting layer comprising silver 19 is at least as thick as the first IR reflecting layer comprising silver 9. In certain preferred embodiments, it has been found that surprisingly beneficial results can be achieved when the second IR reflecting layer comprising silver 19 is thicker than the first IR reflecting layer comprising silver 9, more preferably when second IR reflecting layer 19 is at least 10 angstroms (Å) thicker, more preferably at least 20 angstroms thicker, even more preferably at least 30 angstroms thicker, still more preferably at least 40 angstroms thicker, still more preferably at least 50 angstroms thicker, and most preferably at least 65 angstroms thicker) than the first IR reflecting layer comprising silver 9. In certain example embodiments, the second IR reflecting layer 19 of or including Ag is at least twice as thick as the first IR reflecting layer 9 of or including Ag. All thicknesses herein are physical thicknesses.

In optional embodiments that including an overcoat (not shown) of or including zirconium oxide and/or zirconium oxynitride, that overcoat may be thinner than each of the IR reflecting layers 9, 19 comprising silver in the coating 30. In examples of such embodiments, each of the IR reflecting layers 9 and 19 is at least twice as thick, and more preferably at least three times as thick, as the overcoat layer of or including zirconium oxide and/or zirconium oxynitride.

In certain example embodiments, the center silicon nitride based layer 14 is thicker than each of the other silicon nitride based layers 3 and 24, preferably by at least 100 angstroms, more preferably by at least 200 angstroms, and most preferably by at least 300 angstroms. Moreover, in certain example embodiments, each of the silicon nitride based layers 3, 14 and 24 is at least two times as thick as one or both of the Ag-based IR reflecting layers 9 and 19.

The coating 30 offers good durability and allows for lower glass side and outside visible reflection compared to a single-silver based low-E coating.

In certain example embodiments of this invention, coated articles herein may have the following optical and solar characteristics when measured monolithically (before and/or after optional HT). The sheet resistances ($R_s$) herein take into account all IR reflecting layers (e.g., silver layers 9, 19). Note that "before heat treatment" means as annealed, but before high temperature heat treatment such as thermal tempering as described herein. Note also that $E_n$ refers to normal emissivity, $T_{vis}$ refers to visible transmission, $R_gY$ refers to glass side reflective visible reflectance, and the a* and b* values below with a "g" subscript refers to glass side reflective a* and b* color values respectively.

| Optical/Solar Characteristics (Monolithic - Before Heat Treatment) | | | |
|---|---|---|---|
| Characteristic | General | More Preferred | Most Preferred |
| $R_s$ (ohms/sq.): | <= 5.0 | <= 4.0 | <= 3.6 |
| $E_n$: | <= 0.08 | <= 0.05 | <= 0.04 |
| $T_{vis}$ (Ill. C. 2°): | 25-55% | 30-50% | 35-45% |
| $R_gY$ (Ill. C., 2 deg.): | <= 11% | <= 10% | <= 9% or <= 8% |
| $a*_g$ (Ill. C., 2°): | -4 to +2 | -3 to +1 | -2 to 0 |
| $b*_g$ (Ill. C., 2°): | -7 to +2 | -6 to 0 | -5 to -3 |

| Optical/Solar Characteristics (Monolithic - Post Heat Treatment) | | | |
|---|---|---|---|
| Characteristic | General | More Preferred | Most Preferred |
| $R_s$ (ohms/sq.): | <= 5.0 | <= 4.0 | <= 3.0 |
| $E_n$: | <= 0.08 | <= 0.05 | <= 0.04 |
| $T_{vis}$ (Ill. C. 2°): | 25-60% | 25-55% | 35-50% |
| $R_gY$ (Ill. C., 2 deg.): | <= 11% | <= 10% | <= 9% or <= 8% |
| $a*_g$ (Ill. C., 2°): | -4 to +5 | -3 to +3 | -2 to +2 |
| $b*_g$ (Ill. C., 2°): | -8 to +6 | -6 to +5 | -3 to +3 |

It can be seen from the above that the heat treatment (e.g., thermal tempering) slightly increases the visible transmission of the coated article.

In certain example IG window embodiments of this invention, coated articles herein which have been optionally heat treated to an extent sufficient for tempering, and which have been coupled to another glass substrate to form an IG unit, may have the below recited Optical/Solar characteristics in a structure as shown in FIG. 2 (e.g., where the two glass sheets are each about 3.5 to 6 mm thick of clear glass with about a 13-16 mm gap therebetween filled with 90/10 argon/air).

| Optical/Solar Characteristics (IG unit - non-FIT) | | | |
|---|---|---|---|
| Characteristic | General | More Preferred | Most Preferred |
| $R_s$ (ohms/sq.): | <= 5.0 | <= 4.0 | <= 3.6 |
| $E_n$: | <= 0.08 | <= 0.05 | <= 0.04 |
| $T_{vis}$ (Ill. C. 2°): | 25-55% | 25-50% | 30-45% |
| $RY_{outside}$ (Ill. C., 2 deg.): | <= 11% | <= 10% | <= 9% or <= 8% |
| $a^*_{outside}$ (Ill. C., 2°): | −5 to +2 | −4 to +1 | −3 to 0 |
| $b^*_{outside}$ (Ill. C., 2°): | −7 to +2 | −6 to 0 | −5 to −3 |
| $U_g$ value (W/m$^2$K): | <= 1.20 | <= 1.17 | <= 1.16 |

| Optical/Solar Characteristics (IG Unit - Heat Treated) | | | |
|---|---|---|---|
| Characteristic | General | More Preferred | Most Preferred |
| $R_s$ (ohms/sq.): | <= 5.0 | <= 4.0 | <= 3.0 |
| $E_n$: | <= 0.08 | <= 0.05 | <= 0.04 |
| $T_{vis}$ (Ill. C. 2°): | 25-60% | 25-50% | 30-45% |
| $RY_{outside}$ (Ill. C., 2 deg.): | <= 11% | <= 10% | <= 9% or <= 8% |
| $a^*_{outside}$ (Ill. C., 2°): | −5 to +5 | −4 to +2 | −3 to 0 |
| $b^*_{outside}$ (Ill. C., 2°): | −8 to +6 | −6 to +5 | −5 to +3 |
| $U_g$ value (W/m$^2$K): | <= 1.20 | <= 1.17 | <= 1.16 |

The following examples of this invention are provided for purposes of example only, and are not intended to be limiting unless specifically claimed.

EXAMPLES 1-3

The following Examples 1-3 were made via sputtering coatings on 6 mm thick clear and transparent glass substrates so as to have approximately the layer thicknesses shown in the "example" column in the chart above regarding layer thicknesses.

Set forth below are the optical characteristics of Examples 1-3 measured for a monolithic coated article as shown in FIG. 1. All values measured in the table immediately below are pre-HT. Note that "f" refers to film reflection, i.e., reflection from the film side of the coated article, whereas "g" refers to glass side reflection. Optics were taken Ill. C, 2 degree observer, unless otherwise indicated.

| Monolithic (Pre-HT) | | | |
|---|---|---|---|
| Characteristic | Ex. 1 | Ex. 2 | Ex. 3 |
| $T_{vis}$ (or TY)(Ill. C. 2°): | 39.5% | 39.7% | 40.2% |
| $a^*_t$ (Ill. C. 2°): | −4.1 | −6.6 | −4.0 |
| $b^*_t$ (Ill. C. 2°): | −13.7 | −12.2 | −13.5 |
| $R_fY$ (Ill, C., 2 deg.): | 11.0% | 13.2% | 6.7% |
| $a^*_f$ (Ill. C., 2°): | 18.3 | 18.8 | 24.6 |
| $b^*_f$ (Ill. C., 2°): | 28.2 | 8.5 | 27.9 |
| $R_gY$ (Ill. C., 2 deg.): | 6.6% | 8.7% | 6.5% |
| $a^*_g$ (Ill. C., 2°): | −1.4 | −0.3 | 3.6 |
| $b^*_g$ (Ill. C., 2°): | −3.0 | −5.5 | −1.2 |
| $L^*_g$: | 30.9 | 35.4 | 30.6 |
| $R_s$ (ohms/sq.): | 3.6 | n/a | n/a |

It can be seen from the above the examples above that the coated articles measured monolithically had desirable low visible transmission, and had desirable low glass side visible reflectance and desirable glass side reflective color values. Glass side visible reflection (RgY) was good in that it was below 10%, more preferably no greater than 9%. These are desirable characteristics, especially when the coated article is to be put in an IG window unit as shown in FIG. 2.

| Monolithic (post-HT) | | | |
|---|---|---|---|
| Characteristic | Ex. 1 | Ex. 2 | Ex. 3 |
| $T_{vis}$ (or TY)(Ill. C. 2°): | 44.5% | 43.9% | 45.8% |
| $a^*_t$ (Ill. C. 2°): | −6.7 | −7.9 | −6.8 |
| $b^*_t$ (Ill. C. 2°): | −16.3 | −15.0 | −15.9 |
| $R_fY$ (Ill, C., 2 deg.): | 13.6% | 15.6% | 10.1% |
| $a^*_f$ (Ill. C., 2°): | 17.4 | 17.3 | 21.2 |
| $b^*_f$ (Ill. C., 2°): | 32.4 | 15.0 | 28.6 |
| $R_gY$ (Ill. C., 2 deg.): | 7.2% | 9.4% | 8.6% |
| $a^*_g$ (Ill. C., 2°): | −1.1 | −1.8 | 5.6 |
| $b^*_g$ (Ill. C., 2°): | −0.8 | −3.3 | 4.9 |
| $L^*_g$: | 32.3 | 36.7 | 35.2 |

It can be seen from the above the examples above that the coated articles measured monolithically had desirable low visible transmission ($T_{vis}$ or TY), desirable low glass side visible reflectance ($R_gY$), and had fairly desirable glass side reflective color. Glass side visible reflectance was good in that it was below 10%. These are desirable characteristics, especially when the coated article is to be put in an IG window unit as shown in FIG. 2 so that the coating ends up on surface two of the IG window unit.

The coated articles of Examples 1-3 were put in IG window units as shown in FIG. 2, where glass substrate 1 was 6 mm thick and was Guardian ExtraClear glass, glass substrate 2 was 4 mm thick and was Guardian ExtraClear glass, gap 50 was 16 mm thick, and the gap 50 was filed with 90% argon gas and 10% air. Set forth below are the optical characteristics of IG window units including the coated articles of Examples 1-3, namely when the coated articles are located in IG window units as shown in FIG. 2 (on surface #2 of the IG unit, so that glass side reflective values are indicative of from the outside). The respective tables below demonstrate both non-HT and HT versions of the coated articles in respective IG window units. The "non-HT" refers to annealed coated articles and glass substrates in the IG units, while "HT" refers to thermally tempered coated articles and glass substrates in the IG units. The IG window units were grey/dark grey in appearance and this appearance was achieved without using grey glass substrates (instead, clear glass substrates were used, but the grey appearance was still achieved due to the coating design). The IG units also were desirable in that they realized low visible transmission, low outside visible reflectance, low U-values and low solar factors.

| IG Unit (non-HT) | | | |
|---|---|---|---|
| Characteristic | Ex. 1 | Ex. 2 | Ex. 3 |
| $T_{vis}$ (or TY)(Ill. C. 2°): | 36.2% | 36.4% | 36.7% |
| $a^*_t$ (Ill. C. 2°): | −4.3 | −6.6 | −4.2 |
| $b^*_t$ (Ill. C. 2°): | −12.9 | −11.6 | −13.9 |
| $R_{inside}Y$ (Ill. C., 2 deg.): | 17.5% | 19.4% | 13.5% |
| $a^*_{inside}$ (Ill. C., 2°): | 11.1 | 12.0 | 12.9 |
| $b^*_{inside}$ (Ill. C., 2°): | 13.6 | 4.7 | 10.1 |
| $R_{outside}Y$ (Ill. C., 2 deg.): | 7.9% | 10.1% | 7.9% |
| $a^*_{outside}$ (Ill. C., 2°): | −1.7 | −1.1 | 2.7 |
| $b^*_{outside}$ (Ill. C., 2°): | −5.8 | −7.3 | −4.4 |
| $U_g$ value (W/m$^2$K): | 1.168 | 1.151 | 1.151 |
| Solar Factor (g-value): | 25.8% | 24.8% | 25.5% |
| Solar Factor (g-value, in→out): | 49.9% | 48.0% | 50.7% |

| IG Unit (HT) | | | |
|---|---|---|---|
| Characteristic | Ex. 1 | Ex. 2 | Ex. 3 |
| $T_{vis}$ (or TY)(Ill. C. 2°): | 40.8% | 40.3% | 41.8% |
| $a^*_t$ (Ill. C. 2°): | −6.9 | −7.9 | −6.8 |
| $b^*_t$ (Ill. C. 2°): | −15.3 | −14.3 | −15.1 |
| $R_{inside}Y$ (Ill. C., 2 deg.): | 19.5% | 21.3% | 16.7% |
| $a^*_{inside}$ (Ill. C., 2°): | 11.2 | 11.4 | 12.6 |
| $b^*_{inside}$ (Ill. C., 2°): | 17.4 | 9.0 | 13.1 |
| $R_{outside}Y$ (Ill. C., 2 deg.): | 8.9% | 11.1% | 10.4% |
| $a^*_{outside}$ (Ill. C., 2°): | −2.0 | −2.7 | 4.1 |
| $b^*_{outside}$ (Ill. C., 2°): | −5.0 | −6.3 | −0.3 |
| $U_g$ value (W/m²K): | 1.151 | 1.151 | 1.151 |
| Solar Factor (g-value): | 27.5% | 26.5% | 27.4% |
| Solar Factor (g-value, in→out): | 48.6% | 47.3% | 49.2% |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:
   first and second infrared (IR) reflecting layers comprising silver, the first IR reflecting layer being located closer to the glass substrate than is the second IR reflecting layer;
   a first contact layer comprising NiCr located over and directly contacting the first IR reflecting layer comprising silver;
   a dielectric layer comprising silicon nitride located over and directly contacting the first contact layer comprising NiCr;
   a second contact layer comprising NiCr located over and directly contacting the layer comprising silicon nitride;
   the second IR reflecting layer comprising silver located over and directly contacting the second contact layer comprising NiCr;
   a third contact layer comprising NiCr located over and directly contacting the second IR reflecting layer;
   another dielectric layer comprising silicon nitride located over and directly contacting the third contact layer comprising NiCr;
   wherein the second IR reflecting layer comprising silver is at least twice as thick as the first IR reflecting layer comprising silver; and
   wherein the coated article has a visible transmission, measured monolithically, of no greater than 55% and a glass side visible reflectance, measured monolithically, of no greater than 11%.

2. The coated article of claim 1, wherein the coated article has a glass side visible reflectance, measured monolithically, of no greater than 10%.

3. The coated article of claim 1, wherein the coated article has a glass side visible reflectance, measured monolithically, of no greater than 9%.

4. The coated article of claim 1, wherein the coated article has a glass side visible reflectance, measured monolithically, of no greater than 8%.

5. The coated article of claim 1, wherein the second IR reflecting layer comprising silver is at least 40 angstroms (Å) thicker than is the first IR reflecting layer comprising silver.

6. The coated article of claim 1, wherein the second IR reflecting layer comprising silver is at least 50 angstroms (Å) thicker than is the first IR reflecting layer comprising silver.

7. The coated article of claim 1, wherein the coated article has a visible transmission, measured monolithically, of no greater than 50%.

8. The coated article of claim 1, wherein the coated article has a visible transmission, measured monolithically, of no greater than 45%.

9. The coated article of claim 1, wherein the dielectric layer comprising silicon nitride that is located over and directly contacting the first contact layer comprising NiCr is amorphous.

10. The coated article of claim 1, wherein the first contact layer comprising NiCr is substantially metallic or metallic and contains no more than about 5% (atomic %) oxygen.

11. The coated article of claim 1, wherein the first, second and third contact layers comprising NiCr are each substantially metallic or metallic and contain no more than about 5% (atomic %) oxygen.

12. The coated article of claim 1, wherein said first, second and/or third contact layers comprise nitrogen.

13. The coated article of claim 1, wherein said coated article has a visible transmission of from about 25-55% measured monolithically.

14. The coated article of claim 1, wherein said coated article is not thermally tempered and has a visible transmission of from about 35-45% measured monolithically.

15. The coated article of claim 1, wherein the coated article is thermally tempered.

16. The coated article of claim 15, wherein the coated article is heat treated and has a glass side reflective $\Delta E^*$ value of no greater than 5.0 due to the heat treatment.

17. The coated article of claim 1, wherein the coated article is heat treated and has a visible transmission of from about 35-50% measured monolithically.

18. The coated article of claim 1, wherein the first IR reflecting layer comprising silver is from 30-70 Å thick, and the second IR reflecting layer comprising silver is from 110-180 Å thick.

19. The coated article of claim 1, wherein the coating further comprises an overcoat comprising zirconium oxide.

20. The coated article of claim 1, wherein the coating has a sheet resistance ($R_s$) of less than or equal to 4.0 ohms/square.

21. The coated article of claim 1, wherein the coating further comprises another contact layer comprising NiCr located below and directly contacting the first IR reflecting layer comprising silver.

22. The coated article of claim 1, wherein the coating further comprises a dielectric layer comprising silicon nitride located on and directly contacting the glass substrate.

23. An IG window unit including the coated article of claim 1, and another glass substrate which is coupled to said coated article.

24. The IG window unit of claim 23, wherein the IG window unit is grey or dark grey in appearance as viewed from the outside, and wherein the glass substrates of the IG window unit are clear, not grey, glass substrates.

25. An insulating glass (IG) window unit comprising:
   a coated article including a coating supported by a first glass substrate;
   the first glass substrate with the coating thereon being coupled to a second glass substrate with a gap therebetween, and wherein the first glass substrate is adapted to be at an exterior/outside side of the IG window unit and the second glass substrate is adapted to be at an interior/inside side of the IG window unit adjacent an interior of a building on which the IG window unit is mounted or is to be mounted, and wherein the coating is on a major surface of the first glass substrate facing the gap between the substrates;

wherein the coating supported by the first glass substrate comprises:

first and second infrared (IR) reflecting layers comprising silver, the first IR reflecting layer being located closer to the glass substrate than is the second IR reflecting layer;

a first contact layer comprising NiCr located over and directly contacting the first IR reflecting layer comprising silver;

a dielectric layer comprising silicon nitride located over and directly contacting the first contact layer comprising NiCr;

a second contact layer located over and directly contacting the layer comprising silicon nitride;

the second IR reflecting layer comprising silver located over and directly contacting the second contact layer;

a third contact layer comprising NiCr located over and directly contacting the second IR reflecting layer;

another dielectric layer comprising silicon nitride located over and directly contacting the third contact layer comprising NiCr;

wherein the second IR reflecting layer comprising silver is at least 30 angstroms thicker than is the first IR reflecting layer comprising silver;

wherein the IG window unit has a visible transmission of no greater than 50% and an outside visible reflectance of no greater than 12%; and wherein the IG window unit is grey or dark grey in appearance as viewed from the outside, and wherein the first and second glass substrates of the IG window unit are clear, not grey, glass substrates.

26. IG window unit of claim 25, wherein the second contact layer comprises NiCr.

27. The IG window unit of claim 25, wherein the IG window unit has an outside visible reflectance of no greater than 10%.

28. The IG window unit of claim 25, wherein the second IR reflecting layer comprising silver is at least 40 angstroms (Å) thicker than is the first IR reflecting layer comprising silver.

29. The IG window unit of claim 25, wherein the second IR reflecting layer comprising silver is at least twice as thick as the first IR reflecting layer comprising silver.

30. The IG window unit of claim 25, wherein the glass substrates are thermally tempered.

31. The IG window unit of claim 25, wherein the first IR reflecting layer comprising silver is from 30-70 Å thick, and the second IR reflecting layer comprising silver is from 110-180 Å thick.

32. The IG window unit of claim 25, wherein the coating further comprises an overcoat comprising zirconium oxide.

33. The IG window unit of claim 25, wherein the coating has a sheet resistance ($R_s$) of less than or equal to 4.0 ohms/square.

34. The IG window unit of claim 25, wherein the coating further comprises another contact layer comprising NiCr located below and directly contacting the first IR reflecting layer comprising silver.

* * * * *